US011141717B2

(12) United States Patent
Hengst et al.

(10) Patent No.: US 11,141,717 B2
(45) Date of Patent: Oct. 12, 2021

(54) PALLADIUM/ZEOLITE-BASED PASSIVE NITROGEN OXIDE ADSORBER CATALYST FOR PURIFYING EXHAUST GAS

(71) Applicant: UMICORE AG & CO. KG, Hanau-Wolfgang (DE)

(72) Inventors: Christoph Hengst, Butzbach (DE); Frank-Walter Schuetze, Aschaffenburg (DE); Michael Lennartz, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 16/641,840

(22) PCT Filed: Aug. 24, 2018

(86) PCT No.: PCT/EP2018/072868
§ 371 (c)(1),
(2) Date: Feb. 25, 2020

(87) PCT Pub. No.: WO2019/042883
PCT Pub. Date: Mar. 7, 2019

(65) Prior Publication Data
US 2021/0162382 A1     Jun. 3, 2021

(30) Foreign Application Priority Data

Aug. 31, 2017  (EP) .................................. 17188770

(51) Int. Cl.
| *B01J 29/67* | (2006.01) |
| *B01J 37/02* | (2006.01) |
| *B01J 29/76* | (2006.01) |
| *B01J 29/74* | (2006.01) |
| *B01J 35/04* | (2006.01) |
| *B01D 53/94* | (2006.01) |
| *F01N 3/28* | (2006.01) |
| *F01N 3/20* | (2006.01) |

(52) U.S. Cl.
CPC .......... *B01J 29/67* (2013.01); *B01D 53/9418* (2013.01); *B01D 53/9422* (2013.01); *B01D 53/9431* (2013.01); *B01D 53/9468* (2013.01); *B01D 53/9477* (2013.01); *B01J 29/7476* (2013.01); *B01J 29/763* (2013.01); *B01J 35/04* (2013.01); *B01J 37/0225* (2013.01); *B01J 37/0244* (2013.01); *B01J 37/0246* (2013.01); *F01N 3/2066* (2013.01); *F01N 3/2803* (2013.01); *B01D 2255/1021* (2013.01); *B01D 2255/1023* (2013.01); *B01D 2255/50* (2013.01); *B01D 2255/904* (2013.01); *B01D 2255/9025* (2013.01); *B01D 2255/91* (2013.01); *F01N 2370/04* (2013.01); *F01N 2610/1453* (2013.01)

(58) Field of Classification Search
CPC ............ B01D 53/9422; B01D 53/9459; B01D 2252/00; B01D 2252/602; B01D 2253/108; B01D 2255/102; B01D 2255/91; B01D 2257/402; B01D 2257/404; B01D 2258/012; F01N 3/0814; F01N 3/0842; F01N 3/2066; F01N 2240/18; F01N 2250/12; F01N 2250/14
See application file for complete search history.

(56) References Cited

U.S. PATENT DOCUMENTS

| 3,355,246 A | 11/1967 | Kuehl |
| 3,702,886 A | 11/1972 | Argauer et al. |
| 3,933,974 A | 1/1976 | Winquist |
| 4,000,248 A | 12/1976 | Martin |
| 4,076,842 A | 2/1978 | Plank et al. |
| 4,107,196 A | 8/1978 | Frye et al. |
| 4,139,600 A | 2/1979 | Rollmann et al. |
| 4,251,499 A | 2/1981 | Nanne et al. |
| 4,310,440 A | 1/1982 | Wilson et al. |
| 4,439,409 A | 3/1984 | Puppe et al. |
| 4,544,538 A | 10/1985 | Zones |
| 4,657,750 A | 4/1987 | Takatsu et al. |
| 4,695,440 A | 9/1987 | Morimoto et al. |
| 4,705,674 A | 11/1987 | Araya et al. |
| 4,826,667 A | 5/1989 | Zones et al. |
| 4,859,442 A | 8/1989 | Zones et al. |
| 5,314,674 A | 5/1994 | Francesco et al. |
| 5,958,370 A | 9/1999 | Zones et al. |

(Continued)

FOREIGN PATENT DOCUMENTS

| BE | 1001038 A7 | 6/1989 |
| DE | 10 2008 010 388 A1 | 9/2009 |

(Continued)

OTHER PUBLICATIONS

International Search Report for PCT/EP2018/072868, dated Dec. 6, 2018 (14pgs. with English Translation).
Written Opinion of the International Searching Authority for PCT/EP2018/072868, dated Dec. 6, 2018 (14pgs.).
Miyoshi, et al. SAE Technical Paper Series 950809, Development of New Concept Three-Way Catalyst for Automotive Lean-Burn Engines. Feb. 27-Mar. 2 (pp. 121-130).

(Continued)

*Primary Examiner* — Timothy C Vanoy
(74) *Attorney, Agent, or Firm* — Smith, Gambrell & Russell, LLP

(57) ABSTRACT

The invention relates to a catalyst which comprises a carrier substrate, palladium, and a zeolite, the largest channels of which are formed by 10 tetradrically coordinated atoms; to the use of said catalyst as a passive nitrogen oxide adsorber, an exhaust gas system which contains said catalyst and an SCR catalyst, and to a method for purifying the exhaust gas of motor vehicles using said exhaust gas system.

20 Claims, No Drawings

(56) References Cited

U.S. PATENT DOCUMENTS

| | | | |
|---|---|---|---|
| 5,968,474 A | 10/1999 | Nakagawa et al. | |
| 6,077,498 A | 6/2000 | Cabanas et al. | |
| 6,709,644 B2 | 3/2004 | Zones et al. | |
| 8,431,186 B2 | 4/2013 | Jeske et al. | |
| 8,617,474 B2 | 12/2013 | Bull et al. | |
| 9,657,626 B2* | 5/2017 | Theis | F01N 3/2066 |
| 10,005,075 B2 | 6/2018 | Rajaram et al. | |
| 10,179,329 B2 | 1/2019 | Phillips et al. | |
| 10,428,708 B2 | 10/2019 | Utschig et al. | |
| 10,525,412 B2 | 1/2020 | Chen et al. | |
| 10,669,910 B2 | 6/2020 | Chen et al. | |
| 2008/0141661 A1 | 6/2008 | Voss et al. | |
| 2008/0159936 A1 | 7/2008 | Zones et al. | |
| 2009/0320457 A1 | 12/2009 | Wan | |
| 2014/0170062 A1 | 6/2014 | Moscoso | |
| 2014/0322112 A1 | 10/2014 | Blakeman et al. | |
| 2015/0118150 A1 | 4/2015 | Yang et al. | |
| 2015/0157982 A1 | 6/2015 | Rajaram et al. | |
| 2015/0158019 A1* | 6/2015 | Rajaram | B01J 20/186 423/213.2 |
| 2015/0217282 A1 | 8/2015 | Fedeyko et al. | |
| 2015/0266002 A1 | 9/2015 | Biberger et al. | |
| 2016/0250594 A1* | 9/2016 | Casci | B01D 53/9481 423/239.1 |
| 2017/0001169 A1 | 1/2017 | Collier et al. | |
| 2019/0217269 A1 | 7/2019 | Collier | |
| 2020/0246784 A1 | 8/2020 | Hengst et al. | |

FOREIGN PATENT DOCUMENTS

| | | |
|---|---|---|
| DE | 10 2014 118 092 A1 | 6/2015 |
| DE | 10 2014 118 096 A1 | 6/2015 |
| DE | 10 2015 113 415 A1 | 2/2016 |
| DE | 10 2015 119 913 A1 | 5/2016 |
| DE | 10 2016 112065 A1 | 1/2017 |
| DE | 11 2016 000 032 T5 | 3/2017 |
| EP | 0 040 016 A1 | 11/1981 |
| EP | 0 055 529 A1 | 7/1982 |
| EP | 0 103 981 A1 | 3/1984 |
| EP | 0 255 770 A2 | 2/1988 |
| EP | 0 288 293 A2 | 10/1988 |
| EP | 0 427 970 A2 | 5/1991 |
| EP | 0 885 650 A2 | 12/1998 |
| EP | 1 393 069 A1 | 3/2004 |
| EP | 1 420 149 A2 | 5/2004 |
| EP | 1 433 519 A1 | 6/2004 |
| EP | 1 820 561 A1 | 8/2007 |
| EP | 2 505 803 A2 | 10/2012 |
| EP | 3 009 400 A1 | 4/2016 |
| WO | 2008/047170 A1 | 4/2008 |
| WO | 2008/106519 A1 | 9/2008 |
| WO | 2008/118434 A1 | 10/2008 |
| WO | 2008/132452 A2 | 11/2008 |
| WO | 2012/029050 A1 | 3/2012 |
| WO | 2012/071421 A2 | 5/2012 |
| WO | 2012/156883 A1 | 11/2012 |
| WO | 2012/166868 A1 | 12/2012 |
| WO | 2014/184568 A1 | 11/2014 |
| WO | 2015/085303 A1 | 6/2015 |
| WO | 2016/020351 A1 | 2/2016 |
| WO | 2016/077667 A1 | 5/2016 |
| WO | WO 2017 075 504 A1 * | 5/2017 .......... B01J 35/0013 |

OTHER PUBLICATIONS

Macmillan Journals Ltd. 1978, Synthesis and Structure of Synthetic Zeolite ZSM-11. Nature vol. 275, Sep. 14, 1978 (pp. 119-120).

Corma, et al. Zeolites 15, Synthesis and Characterization of the MCM-22 Zeolite. Issue 1, 1995 (pp. 2-8).

Lawton, et al. J. Chem. Soc., Chem. Commun., Synthesis and Proposed Framework Topology of Zeolite SUZ-4. 1993 (pp. 894-896).

Mayer. Dissertation, Feststoff-SCR-System auf Basis von Ammoniumcarbamat. 2005 (154 pages).

Baerlocher, et al., Atlas of Zeolite Framework Types, 5th revised edition, 2001, ISBN: 0-444-50701-9, pp. 1-303.

English Translation of Written Opinion of the International Searching Authority for PCT/EP2018/072868 dated Dec. 6, 2018 (11 pages).

International Preliminary Report on Patentability for International Patent Application No. PCT/EP2018/072868 dated Mar. 3, 2020 (15 Pages in German with translation).

Leiggener, C., et al. Zeolite A and ZK-4. Material Syntheses. 2008. Editors, Schubert, Hüsing, Laine. pp. 21-28.

DIN 66132: Bestimmung der spezifischen Oberfläche von Feststoffen durch Stickstoffadsorption; Einpunkt-Differenzverfahren nach Haul and Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German (with English machine translation).

Non Final Office Action dated Jun. 4, 2021 for U.S. Appl. No. 16/641,876 (7 pages).

Non Final Office Action dated Mar. 9, 2021 for U.S. Appl. No. 16/641,876 (9 pages).

* cited by examiner

PALLADIUM/ZEOLITE-BASED PASSIVE NITROGEN OXIDE ADSORBER CATALYST FOR PURIFYING EXHAUST GAS

The present invention relates to a passive nitrogen oxide adsorber for the passive storage of nitrogen oxides from the exhaust gas of a combustion engine, which comprises a 10-ring zeolite plated with palladium.

The exhaust gas of motor vehicles that are operated with lean-burn combustion engines, such as diesel engines, also contains, in addition to carbon monoxide (CO) and nitrogen oxides ($NO_x$), components that result from the incomplete combustion of the fuel in the combustion chamber of the cylinder. In addition to residual hydrocarbons (HC), which are usually also predominantly present in gaseous form, these include particle emissions, also referred to as "diesel soot" or "soot particles." These are complex agglomerates from predominantly carbonaceous particulate matter and an adhering liquid phase, which usually preponderantly consists of longer-chained hydrocarbon condensates. The liquid phase adhering to the solid components is also referred to as "Soluble Organic Fraction SOF" or "Volatile Organic Fraction VOF."

To clean these exhaust gases, the aforementioned components must be converted to harmless compounds as completely as possible. This is only possible with the use of suitable catalysts.

Soot particles may be very effectively removed from the exhaust gas with the aid of particle filters. Wall flow filters made of ceramic materials have proved particularly successful. These are made up of a multiple number of parallel channels formed by porous walls. The channels are closed alternately at one end of the filter such that first channels are formed that are open at the first side of the filter and closed at the second side of the filter, along with second channels that are closed at the first side of the filter and open at the second side of the filter. The exhaust gas flowing into the first channels, for example, may leave the filter again only via the second channels and must flow through the porous walls between the first and second channels for this purpose. The particles are retained when the exhaust gas passes through the wall. It is known that particle filters can be provided with catalytically-active coatings. EP1820561 A1, for example, describes the coating of a diesel particle filter having a catalyst layer which facilitates the burning off of filtered soot particles.

A known method for removing nitrogen oxides from exhaust gases in the presence of oxygen is selective catalytic reduction (SCR method) by means of ammonia on a suitable catalyst. In this method, the nitrogen oxides to be removed from the exhaust gas are converted to nitrogen and water using ammonia.

For example, iron-exchanged and in particular copper-exchanged zeolites can be used as SCR catalysts; see for example WO 2008/106519 A1, WO 2008/118434 A1 and WO 2008/132452 A2. SCR catalysts for the conversion of nitrogen oxides with ammonia do not contain any noble metals, in particular no platinum and no palladium. In the presence of such metals, the oxidation of ammonia with oxygen to form nitrogen oxides would take place preferentially and the SCR reaction (reaction of ammonia with nitrogen oxide) would fall behind. Where the literature sometimes speaks of platinum-exchanged or palladium-exchanged zeolites as "SCR catalysts," this does not refer to the NH3-SCR reaction but to the reduction of nitrogen oxides by means of hydrocarbons. However, the latter conversion is not very selective and is therefore referred to as the "HC-DeNOx reaction" instead of the "SCR reaction."

The ammonia used as reducing agent can be made available by dosing an ammonia precursor compound, such as urea, ammonium carbamate or ammonium formate, into the exhaust tract and subsequent hydrolysis.

SCR catalysts have the disadvantage that they only work from an exhaust gas temperature of approximately 180 to 200° C., and thus do not convert nitrogen oxides, which are formed in the cold start phase of the engine.

In order to remove the nitrogen oxides, so-called "nitrogen oxide storage catalysts" are also known, for which the term "lean NOx trap," or "LNT" is common. Their cleaning effect is based on the fact that, in a lean operating phase of the engine, the nitrogen oxides are stored by the storage material of the storage catalysts predominantly in the form of nitrates, and such oxides are decomposed again in a subsequent rich operating phase of the engine, and the nitrogen oxides released in this manner are converted into nitrogen, carbon dioxide and water with the reducing exhaust gas components in the storage catalyst. This operating principle is described in, for example, the SAE document SAE 950809.

Storage materials that may be used include in particular oxides, carbonates or hydroxides of magnesium, calcium, strontium, barium, alkali metals, rare earth metals or mixtures thereof. Due to their basic properties, such compounds are able to form nitrates with the acidic nitrogen oxides of the exhaust gas and store them in this manner. They are deposited on suitable carrier materials with as high a dispersion as possible, to create a large surface of interaction with the exhaust gas. In addition, nitrogen oxide storage catalysts usually contain precious metals such as platinum, palladium and/or rhodium as catalytically active components. Their task is, on the one hand, under lean conditions to oxidize NO to $NO_2$, along with CO and HC to $CO_2$, and, on the other hand, to reduce released $NO_2$ to nitrogen during the rich operating phases, in which the nitrogen oxide storage catalyst is regenerated. Modern nitrogen oxide storage catalysts are described in, for example, EP0885650 A2, US2009/320457, WO2012/029050 A1, and WO2016/020351 A1.

It is already known to combine soot particle filters and nitrogen oxide storage catalysts. For example, EP1420 149 A2 and US2008/141661 describe systems comprising a diesel particle filter and a nitrogen oxide storage catalyst arranged downstream.

Moreover, it has already been proposed in, for example, EP1393069 A2, EP1433519 A1, EP2505803 A2, and US2014/322112 to coat particle filters with nitrogen oxide storage catalysts. US2014/322112 describes a zoning of the coating of the particle filter with nitrogen oxide storage catalyst in such a way that a zone starting from the upstream end of the particle filter is located in the input channels, and another zone starting from the downstream end of the particle filter is located in the output channels.

The procedure described in SAE Technical Paper 950809, in which the nitrogen oxides are stored by a nitrogen oxide storage catalyst in a lean operating phase of the engine and are released again in a subsequent rich operating phase, is also referred to as active nitrogen oxide storage.

In addition, a method known as passive nitrogen oxide storage has also been described. Thereby, nitrogen oxides are stored in a first temperature range and released again in a second temperature range, wherein the second temperature range is at higher temperatures than the first temperature range. Passive nitrogen oxide storage catalysts are used to implement this method, which catalysts are also referred to as PNA (for "passive NOx adsorbers").

Passive nitrogen oxide storage catalysts can be used to store and release nitrogen oxides, particularly at temperatures below 200° C., at which an SCR catalyst has not yet reached its operating temperature, as soon as the SCR catalyst is ready for operation. In this way, an increased total nitrogen oxide conversion of the exhaust gas aftertreatment system is realized by the temporary storage of the nitrogen oxides emitted by the engine below 200° C. and the concerted release of those nitrogen oxides above 200° C.

Palladium supported on cerium oxide has been described as a passive nitrogen oxide storage catalyst; see for example WO2008/047170 A1 and WO2014/184568 A1, which can also be coated on a particle filter according to WO2012/071421 A2 and WO2012/156883 A1.

It is known from WO2012/166868 A1 that a zeolite containing palladium and another metal such as iron is used as a passive nitrogen oxide storage catalyst.

WO2015/085303 A1 discloses passive nitrogen oxide storage catalysts which contain a precious metal and a small-pore molecular sieve with a maximum ring size of eight tetrahedral atoms. Passive nitrogen oxide storage catalysts are also disclosed in DE102016112065A1, DE102014118096A1, DE102015119913A1, DE102008010388A1 and DE102015113415A1. Palladium-containing zeolites are also known from EP 427970A2, US2015/217282, DE102008010388A1 and DE 102015113415A1.

Modern and future diesel engines are becoming ever more efficient, which also reduces exhaust gas temperatures. At the same time, legislation regarding nitrogen oxide conversion is becoming increasingly stringent. This is leading to the fact that SCR catalysts alone are no longer sufficient to comply with the nitrogen oxide limits. In particular, there continues to be further need for technical solutions that ensure that nitrogen oxides formed during the engine's cold-start phase do not escape into the environment.

It has now been found that zeolites coated with palladium, the largest channels of which are formed by 10 tetrahedrally coordinated atoms, have excellent passive nitrogen oxide adsorption properties.

The present invention accordingly relates to a catalyst comprising a carrier substrate of length L, palladium and a zeolite, whose largest channels are formed by 10 tetrahedrally coordinated atoms.

Zeolites are two or three-dimensional structures, the smallest structures of which can be considered to be $SiO_4$ and $AlO_4$ tetrahedra. These tetrahedra come together to form larger structures, wherein two are connected each time via a common oxygen atom. Rings of different sizes can be formed, for example rings of four, six or even nine tetrahedrally coordinated silicon or aluminum atoms. The different zeolite types are often defined by the largest ring size, because this size determines which guest molecules can and cannot penetrate the zeolite structure. It is customary to differentiate between large-pore zeolites with a maximum ring size of 12, medium-pore zeolites with a maximum ring size of 10, and small-pore zeolites with a maximum ring size of 8.

Zeolites are further divided into structure types by the Structural Commission of the International Zeolite Association, each of which is assigned a three-letter code; see for example Atlas of Zeolite Framework Types, Elsevier, 5th edition, 2001.

The catalyst according to the invention preferably comprises zeolites whose largest channels are formed by 10 tetrahedrally coordinated atoms which correspond to the structure types *MRE, AEL, AFO, AHT, BOF, BOZ, CGF, CGS, CSV, DAC, EUO, FER, HEU, IFW, IMF, ITH, ITR, JRY, JST, LAU, MEL, MFS, MTT, MVY, MWW, NES, OBW, -PAR, PCR, PON, PSI, RRO, SFF, SFG, STF, STI, STW, -SVR, SZR, TER, TON, TUN, UOS, WEI or -WEN.

Zeolites of structure type AEL are AlPO-11 and SAPO-11. Zeolites of structure type AFO are AlPO-41 and SAPO-41. A zeolite of structure type AHT is AlPO-H2. Zeolites of structure type CGS are TUN-1 and TsG-1. Zeolites of structure type DAC are dachiardite and svetlozarite. Zeolites of structure type EUO are EU-1, TPZ-3 and ZSM-50. Zeolites of structure type FER are ferrierite, FU-9, ISI-6, NU-23, Sr-D and ZSM-35. Zeolites of structure type HEU are heulandite, clinoptilolite and LZ-219. A zeolite of structure type IMF is IM-5. Zeolites of structure type ITH are ITQ-13 and IM-7. Zeolites of structure type LAU are laumontite and leonhardite. Zeolites of structure type MEL are ZSM-11, SSZ-46 and TS-2, Zeolites of structure type MFS are ZSM-57 and COK-5. Zeolites of structure type MTT are ZSM-23, EU-13, ISI-4 and KZ-1. Zeolites of structure type MWW are MCM-22, ERB-1, ITQ-1, PSH-3 and SSZ-25. Zeolites of structure type NES are NU-87 and gottardite. A zeolite of structure type OBW is OSB-2. A zeolite of structure type -PAR is parthéite. A zeolite of structure type PON is IST-1. A zeolite of structure type RRO is RUB-41. A zeolite of structure type SFF is SSZ-44. A zeolite of structure type SFG is SSZ-58. Zeolites of structure type STF are SSZ-35, ITQ-9 and Mu-26. Zeolites of structure type STI are stilbite, barrerite, stellite and TNU-10. A zeolite of structure type SZR is SUZ-4. A zeolite of structure type TER is terranovaite. Zeolites of structure type TON are Theta-1, ISI-1, KZ-2, NU-10 and ZSM-22. A zeolite of structure type TUN is TNU-9. A zeolite of structure type WEI is weinebeneite. A zeolite of structure type -WEN is wenkite.

The catalyst according to the invention particularly preferably comprises zeolites whose largest channels are formed by 10 tetrahedrally coordinated atoms and which belong to structure type MEL, MTT, MWW or SZR.

The catalyst according to the invention particularly preferably comprises zeolites whose largest channels are formed by 10 tetrahedrally coordinated atoms and which belong to structure type FER.

The catalyst according to the invention very particularly preferably comprises zeolites whose largest channels are formed by 10 tetrahedrally coordinated atoms and which belong to structure type MWW.

Particularly preferred zeolites belonging to structure type MEL are known from the literature. Thus, ZSM-11 is described in Nature 275, 119-120, 1978, SSZ-46 in U.S. Pat. No. 5,968,474 and TS-2 in BE 1001038.

Particularly preferred zeolites belonging to structure type MTT are known from the literature. Thus, ZSM-23 is described in U.S. Pat. No. 4,076,842, EU-13 in U.S. Pat. No. 4,705,674 and ISI-4 in U.S. Pat. No. 4,657,750. In addition, U.S. Pat. No. 5,314,674 deals with the synthesis of zeolites of structure type MTT.

Very particularly preferred zeolites belonging to structure type MWW are known from the literature. Thus, SSZ-25 is described in U.S. Pat. No. 4,826,667, MCM-22 in Zeolites 15, Issue 1, 2-8, 1995, ITQ-1 in U.S. Pat. No. 6,077,498 and PSH-3 in U.S. Pat. No. 4,439,409.

Particularly preferred zeolites belonging to structure type SZR are known from the literature. Thus, SUZ-4 is described in J. Chem. Soc., Chem. Commun., 1993, 894-896.

Particularly preferred zeolites belonging to structure type FER are known from the literature. Thus, ZSM-35 is described in U.S. Pat. No. 4,107,196, NU-23 in EP 103981 A1, FU-9 in EP 55529 A1, ISI-6 in U.S. Pat. No. 4,695,440 and ferrierite for example in U.S. Pat. Nos. 3,933,974, 4,000,248 and 4,251,499.

The catalyst according to the invention is preferably free of zeolites whose largest channels are not formed by 10 tetrahedrally coordinated atoms. For example, the catalyst of the present invention does not comprise any zeolite of structure type LTL.

The catalyst according to the invention comprises palladium. The palladium is preferably present as palladium cation in the zeolite structure, that is to say in ion-exchanged form. However, the palladium may also be wholly or partially present as palladium metal and/or as palladium oxide in the zeolite structure and/or on the surface of the zeolite structure.

The palladium may be present in amounts of from 0.01 to 20% by weight based on the sum of the weights of zeolite and palladium and calculated as palladium metal.

Palladium is preferably present in amounts of 0.5 to 10% by weight, particularly preferably from 1.5 to 10% by weight or 1.5 to 4% by weight, and very particularly preferably from 1.5 to 2% by weight, based on the sum of the weights of zeolite and palladium and calculated as palladium metal.

Except for palladium, the catalyst according to the invention preferably comprises no further metal, in particular not copper, nor iron, nor platinum.

A preferred catalyst according to the invention comprises a zeolite of structure type MWW, for example MCM-22, ERB-1, ITQ-1, PSH-3 or SSZ-25, and palladium as the sole metal in an amount of 1.5 to 10% by weight, based on the sum of the weights of zeolite and palladium and calculated as palladium metal, along with no zeolite whose largest channels are not formed by 10 tetrahedrally coordinated atoms. For example, this catalyst according to the invention does not comprise a zeolite of structure type LTL.

The catalyst according to the invention comprises a support body. This may be a flow-through substrate or a wall flow filter.

A wall flow filter is a support body comprising channels of length L, which extend in parallel between first and second ends of the wall flow filter, which are alternately closed at either the first or second end and are separated by porous walls. A flow-through substrate differs from a wall flow filter in particular in that the channels of length L are open at its two ends.

In an uncoated state, wall flow filters have porosities of 30 to 80%, in particular 50 to 75%, for example. In the uncoated state, their average pore size is 5 to 30 micrometers, for example. As a rule, the pores of the wall flow filter are so-called open pores, that is, they have a connection to the channels. In addition, the pores are usually interconnected with one another. This allows, on the one hand, easy coating of the inner pore surfaces and, on the other hand, easy passage of the exhaust gas through the porous walls of the wall flow filter.

Like wall flow filters, flow-through substrates are known to the person skilled in the art and are available on the market. They consist, for example, of silicon carbide, aluminum titanate, or cordierite.

Alternatively, support bodies constructed from corrugated sheets of inert materials can also be used. Suitable inert materials are, for example, fibrous materials having an average fiber diameter of 50 to 250 μm and an average fiber length of 2 to 30 mm. Fibrous materials are preferably heat-resistant and consist of silicon dioxide, in particular glass fibers.

For the production of such support bodies, for example, sheets of the aforementioned fiber materials are corrugated in the known manner and the individual corrugated sheets are formed into a cylindrical monolithically structured body with channels running through the bodies. Preferably, a monolithically structured body with a crosswise corrugation structure is formed by stacking a number of the corrugated sheets into parallel layers with different orientation of the corrugation between the layers. In one embodiment, uncorrugated, i.e. flat, sheets can be arranged between the corrugated sheets.

Support bodies made of corrugated sheets can be coated directly with the catalyst according to the invention, but they are preferably first coated with an inert material, for example titanium dioxide, and only then with the catalytic material.

In a further embodiment of the catalyst according to the invention, the zeolite and the palladium are present in the form of a coating on the carrier substrate. The coating may thereby extend over the entire length L of the carrier substrate or only over a section thereof. In the case of a wall flow filter, the coating may be situated on the surfaces of the input channels, on the surfaces of the output channels, and/or in the porous wall between the input and output channels.

By coating, the person skilled in the art in the field of automotive exhaust gas catalysis understands a material zone which is also called a washcoat and is generally applied to the support body by means of an aqueous suspension.

Catalysts according to the invention in which the zeolite and the palladium are present in the form of a coating on the carrier substrate can be produced by methods familiar to the person skilled in the art, for example by customary dip-coating methods or by pump and suction coating methods with a thermal post-treatment (calcination). The person skilled in the art is aware that, in the case of wall flow filters, their average pore size and the average particle size of the materials to be coated can be matched to each other in such a manner that they lie on the porous walls that form the channels of the wall flow filter (on-wall coating). The mean particle size of the materials to be coated can also be selected such that they are located in the porous walls that form the channels of the wall flow filter; i.e., that the inner pore surfaces are coated (in-wall coating). In this case, the average particle size of the coating materials must be small enough to penetrate into the pores of the wall flow filter.

In one embodiment of the present invention, the zeolite and palladium are coated over the entire length L of the carrier substrate, wherein no additional catalytically active coating is present on the carrier substrate.

In other embodiments of the present invention, however, the carrier substrate may also carry one or more further catalytically active coatings.

For example, in addition to a coating comprising the zeolite and the palladium, the carrier substrate may comprise a further coating, which is active in terms of catalytic oxidation. The coating that is active in terms of catalytic oxidation comprises, for example, platinum, palladium or platinum and palladium on a carrier material. In the latter case, the mass ratio of platinum to palladium is, for example, 4:1 to 14:1.

All materials that are familiar to the person skilled in the art for this purpose are considered as carrier materials. They have a BET surface of 30 to 250 $m^2/g$, preferably of 100 to 200 $m^2/g$ (determined according to DIN 66132), and are in particular aluminum oxide, silicon oxide, magnesium oxide, titanium oxide, along with mixtures or mixed oxides of at least two of these materials.

Aluminum oxide, magnesium/aluminum mixed oxides, and aluminum/silicon mixed oxides are preferred. If aluminum oxide is used, it is, particularly preferably stabilized, e.g., with 1 to 6% by weight—in particular, 4% by weight—lanthanum oxide.

The coating (hereinafter referred to as coating A) comprising the zeolite and the palladium and the coating (hereinafter referred to as coating B) that is active in terms of catalytic oxidation can be arranged on the substrate in different ways.

If the carrier substrate is a flow-through substrate, both coatings may, for example, be present coated over the entire length L or only over a section of the carrier substrate.

For example, the coating A can extend from one end of the support body to 10 to 80% of its length L and the coating B can extend from the other end of the support body to 10 to 80% of its length $L_A$. It may be, in this case, that $L=L_A+L_B$ applies, wherein $L_A$ is the length of coating A, and $L_B$ is the length of coating B. However, $L<L_A+L_B$ may also apply. In this case, coatings A and B overlap. Finally, $L>L_A+L_B$ may also apply if a section of the support body remains free of coatings. In the latter case, a gap, which is at least 0.5 cm long, i.e., for example, 0.5 to 1 cm, remains between coatings A and B.

However, coatings A and B may both also be coated over the entire length L. In this case, coating B, for example, may be present directly on the carrier substrate, and coating A on coating B. Alternatively, coating A may also be present directly on the carrier substrate and coating B on coating A.

It is also possible that one coating may extend over the entire length of the support body and the other coating may extend over only part of it.

In a preferred embodiment, one zeolite of type FER, MEL, MTT, MWW or SZR, in particular MWW, coated with 1 to 2% by weight, in particular 1.5 to 2% by weight, palladium lies directly on the carrier substrate over its entire length L and on this coating there lies a coating containing platinum or platinum and palladium in the mass ratio of 4:1 to 14:1, likewise over the entire length L.

In particular, the lower layer (for example Pd-FER or Pd-MWW) is present in an amount of 50 to 250 g/l carrier substrate and the upper layer (Pt or Pt/Pd) in an amount of 50 to 100 g/l carrier substrate.

If the carrier substrate is a wall flow filter, the coatings A and B may extend over the entire length L of the wall flow filter or only part of it, as described above for flow substrates. In addition, the coatings may lie on the walls of the input channels, on the walls of the output channels or in the walls between the input and output channels.

In another embodiment of the present invention, the carrier substrate is formed from the zeolite whose largest channels are formed by 10 tetrahedrally coordinated atoms, palladium, and a matrix component.

Carrier substrates, flow-through substrates and wall flow substrates that do not just consist of inert material, such as cordierite, but additionally contain a catalytically active material are known to the person skilled in the art. To produce them, a mixture consisting of, for example, 10 to 95% by weight of an inert matrix component and 5 to 90% by weight of catalytically active material is extruded according to a method known per se. All of the inert materials that are also otherwise used to produce catalyst substrates can be used as matrix components in this case. These are, for example, silicates, oxides, nitrides, or carbides, wherein in particular magnesium aluminum silicates are preferred.

In embodiments of the present invention, the extruded carrier substrate, which comprises the zeolite whose largest channels are formed by 10 tetrahedrally coordinated atoms, along with palladium, may be coated with one or more catalytically active coatings, such as the coating that is active in terms of catalytic oxidation described above.

The catalyst according to the invention is excellently suited as a passive nitrogen oxide storage catalyst; i.e., it can take into storage nitrogen oxides at temperatures below 200° C. and take them out of storage again at temperatures above 200° C.

The present invention thus also relates to the use of a catalyst which comprises a carrier substrate of length L, palladium and a zeolite, whose largest channels are formed by 10 tetrahedrally coordinated atoms, as a passive nitrogen oxide storage catalyst which stores nitrogen oxides in a first temperature range and releases them again in a second temperature range, wherein the second temperature range is at higher temperatures than the first temperature range.

In particular, the present invention relates to the use of a catalyst comprising a carrier substrate of length L, a zeolite of structure type MWW, for example MCM-22, ERB-1, ITQ-1, PSH-3 or SSZ-25, and palladium as the sole metal in an amount of 1.5 to 10% by weight, based on the sum of the weights of zeolite and palladium and calculated as palladium metal, along with no zeolite whose largest channels are not formed by 10 tetrahedrally coordinated atoms.

In combination with an SCR catalytic converter on the downstream side, the catalyst according to the invention allows nitrogen oxides to be converted effectively over the entire temperature range of the exhaust gas, including the cold start temperatures.

The present invention therefore relates to an exhaust gas system comprising
a) a catalyst which comprises a carrier substrate of length L, palladium and a zeolite, whose largest channels are formed by 10 tetrahedrally coordinated atoms, and
b) an SCR catalyst.

In the exhaust gas system according to the invention, the SCR catalyst may in principle be selected from all catalysts active in the SCR reaction of nitrogen oxides with ammonia, in particular from those known as being conventional to the person skilled in the art in the field of automotive exhaust gas catalysis. This includes catalysts of the mixed-oxide type, as well as catalysts based upon zeolites—in particular, upon transition metal-exchanged zeolites.

In embodiments of the present invention, SCR catalysts are used that contain a small-pore zeolite with a maximum ring size of eight tetrahedral atoms and a transition metal. Such SCR catalysts are described, for example, in WO2008/106519 A1, WO2008/118434 A1 and WO2008/132452 A2.

In addition, however, large-pored and medium-pored zeolites can also be used, in particular those of structure type BEA being suitable. Thus, iron-BEA and copper-BEA are of interest.

Particularly preferred zeolites belong to the BEA, AEI, CHA, KFI, ERI, LEV, MER, or DDR structure types and are particularly preferably exchanged with cobalt, iron, copper, or mixtures of two or three of these metals.

The term zeolites here also includes molecular sieves, which are sometimes also referred to as "zeolite-like" compounds. Molecular sieves are preferred, if they belong to one of the aforementioned structure types. Examples include silica aluminum phosphate zeolites, which are known by the term SAPO, and aluminum phosphate zeolites, which are known by the term AlPO. These too are particularly preferred, when they are exchanged with cobalt, iron, copper, or mixtures of two or three of these metals.

Preferred zeolites are furthermore those that have an SAR (silica-to-alumina ratio) value of 2 to 100, in particular, of 5 to 50.

The zeolites or molecular sieves contain transition metal—in particular, in quantities of 1 to 10 wt %, and especially 2 to 5 wt %—calculated as metal oxide, i.e., for example, as $Fe_2O_3$ or CuO.

Preferred embodiments of the present invention contain zeolites or molecular sieves of the beta type (BEA), chabazite type (CHA) or Levyne type (LEV) exchanged as SCR catalysts with copper, iron or copper and iron. Corresponding zeolites or molecular sieves are known, for example, under the designations ZSM-5, beta, SSZ-13, SSZ-62, Nu-3, ZK-20, LZ-132, SAPO-34, SAPO-35, AlPO-34 and AlPO-35; see, for example, U.S. Pat. Nos. 6,709,644 and 8,617,474.

In one embodiment of the exhaust gas system according to the invention, an injection device for a reducing agent is located between the SCR catalyst and the catalyst, which has a carrier substrate of length L, palladium and a zeolite, whose largest channels are formed by channels of 8 tetrahedrally coordinated atoms.

The injection device can be chosen at will by the expert, wherein suitable devices can be taken from the literature (see, for example, T. Mayer, Solids SCR system based on ammonium carbamate, Dissertation, Technical University of Kaiserslautern, 2005). The ammonia can be injected into the exhaust gas stream via the injection device as such or in the form of a compound from which ammonia is formed under ambient conditions. Examples of suitable compounds are aqueous solutions of urea or ammonium formate, as also solid ammonium carbamate. As a rule, the reducing agent or precursor thereof is held available in an accompanying container which is connected to the injection device.

The SCR catalyst is preferably in the form of a coating on a support body, which can be a flow substrate or a wall flow filter and can consist of silicon carbide, aluminum titanate or cordierite, for example.

Alternatively, the support body itself can consist of the SCR catalyst and a matrix component as described above; i.e., in extruded form.

The present invention also relates to a method for purifying the exhaust gases of motor vehicles which are operated with lean-burn engines, such as diesel engines, characterized in that the exhaust gas is passed through an exhaust gas system according to the invention.

EXAMPLE 1 a) A zeolite of structure type FER is impregnated with 3% by weight palladium (from commercially available palladium nitrate) ("incipient wetness"). The powder thus obtained is then dried at 120° C. and calcined at 500° C.

b) The resulting calcined powder containing Pd is suspended in deionized water, mixed with 8% of a commercially available boehmite-based binder and ground by means of a ball mill. Subsequently, according to a conventional method, a commercially available honeycomb ceramic substrate (flow-through substrate) is coated along its entire length with the washcoat thus obtained. The washcoat load is 50 g/L in relation to the zeolites containing Pd (corresponds to 54 g/L incl. binder), which corresponds to a precious metal load of 42.5 $g/ft^3$ Pd. The catalyst thus obtained is calcined at 550° C.

EXAMPLE 2

Example 1 is repeated with the difference that the ceramic substrate is coated with 100 g/L zeolite containing Pd (corresponding to 108 g/L including binder). This corresponds to a precious metal load of 85 $g/ft^3$ Pd.

EXAMPLE 3

Example 1 is repeated with the difference that the ceramic substrate is coated with 200 g/L zeolite containing Pd (corresponding to 216 g/L including binder). This corresponds to a precious metal load of 170 $g/ft^3$ Pd.

EXAMPLE 4

Example 2 is repeated with the difference that the zeolite is impregnated with 1.5% by weight palladium. This corresponds to a precious metal load of 42.5 $g/ft^3$ Pd.

EXAMPLE 5

Example 3 is repeated with the difference that the zeolite is impregnated with 1.5% by weight palladium. This corresponds to a precious metal load of 85 $g/ft^3$ Pd.

EXAMPLE 6

Example 3 is repeated with the difference that the zeolite is impregnated with 0.75% by weight palladium. This corresponds to a precious metal load of 42.5 $g/ft^3$ Pd.

EXAMPLE 7

In a further step according to a common method, the catalyst obtained in accordance with example 5 is also coated over its entire length with a washcoat that contains platinum supported on aluminum oxide. The washcoat load of the second layer is 75 g/L, the platinum load is 20 $g/ft^3$.

EXAMPLE 8

The catalyst according to Example 7 is combined with a second coated flow-through substrate to form an exhaust gas system. Here, the second flow-through substrate is exchanged with a zeolite of structure type chabazite exchanged with 3% by weight copper (calculated as CuO). The washcoat load of the second flow-through substrate is 150 g/L.

EXAMPLE 9

Example 1 is repeated with the difference that a zeolite of structure type MWW was used.

The invention claimed is:

1. Catalyst comprising a carrier substrate of length L and a composition that is composed of palladium and a zeolite whose largest channels are formed by 10 tetrahedrally coordinated atoms, and wherein the composition has no zeolite whose largest channels are not formed by 10 tetrahedrally coordinated atoms.

2. Catalyst according to claim 1, characterized in that the zeolite is of structure type *MRE, AEL, AFO, AHT, BOF, BOZ, CGF, CGS, CSV, DAC, EUO, FER, HEU, IFW, IMF, ITH, ITR, JRY, JST, LAU, MEL, MFS, MTT, MVY, MWW, NES, OBW, -PAR, PCR, PON, PSI, RRO, SFF, SFG, STF, STI, STW, -SVR, SZR, TER, TON, TUN, UOS, WEI or -WEN.

3. Catalyst according to claim 1, characterized in that the zeolite is of structure type MEL, MTT, MWW or SZR.

4. Catalyst according to claim 1, characterized in that the zeolite is of structure type MWW.

5. Catalyst according to claim 1, characterized in that the palladium is present in the zeolite structure as palladium cation.

6. Catalyst according to claim 1, characterized in that the palladium is present in amounts of 1.5 to 10% by weight, based on the sum of the weights of zeolite and palladium and calculated as palladium metal.

7. Catalyst according to claim 1, characterized in that the composition has palladium as the sole metal in an amount of 1.5 to 10% by weight, based on the sum of the weights of zeolite and palladium and calculated as palladium metal.

8. Catalyst according to claim 7, characterized in that the zeolite is of structure type MWW, MCM-22, ERB-1, ITQ-1, PSH-3 or SSZ-25.

9. Catalyst according to claim 1, characterized in that the composition is present in the form of a coating on the carrier substrate.

10. Catalyst according to claim 9, characterized in that the carrier substrate carries a further catalytically active coating which is a coating that is active in terms of catalytic oxidation and comprises platinum, palladium or platinum and palladium on a carrier material.

11. Catalyst according to claim 1, characterized in that the composition has a zeolite of structure type FER, MEL, MTT, MWW or SZR coated with 1.5 to 2% by weight palladium, and the composition is supported as a coating on the carrier substrate, which coating extends directly on the carrier substrate over its entire length L and on this coating there is a second coating containing platinum or platinum and palladium in the mass ratio of 4:1 to 14:1 over the entire length L.

12. Catalyst according to claim 1, wherein the catalyst is a passive nitrogen oxide storage catalyst which stores nitrogen oxides in a first temperature range and releases them again in a second temperature range, wherein the second temperature range is at higher temperatures than the first temperature range.

13. Catalyst according to claim 12, characterized in that the catalyst comprises a zeolite of structure type MWW and palladium as the sole metal in an amount of 1.5 to 10% by weight, based on the sum of the weights of zeolite and palladium and calculated as palladium metal.

14. Exhaust gas system comprising a) a first catalyst according to claim 1, and b) a second catalyst which is an SCR catalyst.

15. Exhaust gas system according to claim 14, characterized in that the SCR catalyst is a zeolite belonging to structure type BEA, AEI, CHA, KFI, ERI, LEV, MER or DDR and is exchanged with cobalt, iron, copper or mixtures of two or three of these metals.

16. Exhaust gas system according to claim 14, characterized in that an injection device for a reducing agent is located between the SCR catalyst and the first catalyst.

17. Method for purifying the exhaust gases of motor vehicles operated with lean-burn engines, characterized in that the exhaust gas is passed through an exhaust gas system according to claim 14.

18. Exhaust system according to claim 14 wherein the SCR catalyst is positioned downstream, with respect to exhaust gas flow, of the first catalyst.

19. Catalyst according to claim 1, characterized in that the catalyst has palladium as the sole metal in the composition.

20. A catalyst comprising a carrier substrate of length L and a coating applied on the carrier substrate, with the coating having a composition that is composed of palladium and a zeolite whose largest channels are formed by 10 tetrahedrally coordinated atoms, and wherein the coating has no zeolite whose largest channels are not formed by 10 tetrahedrally coordinated atoms.

* * * * *